(12) United States Patent  (10) Patent No.: US 6,909,668 B2
Baldwin et al.  (45) Date of Patent: Jun. 21, 2005

(54) ULTRASONIC DISPLACEMENT SENSOR USING ENVELOPE DETECTION

(75) Inventors: John R. Baldwin, Bridgeport, CT (US); Martin D. Fox, Stores, CT (US)

(73) Assignee: Hubbell Incorporated, Orange, CT (US)

( * ) Notice: Subject to any disclaimer, the term of this patent is extended or adjusted under 35 U.S.C. 154(b) by 304 days.

(21) Appl. No.: 10/243,732

(22) Filed: Sep. 16, 2002

(65) Prior Publication Data

US 2004/0051639 A1 Mar. 18, 2004

(51) Int. Cl.⁷ .............................................. G08B 13/18
(52) U.S. Cl. ...................................................... 367/96
(58) Field of Search ....................... 367/93–98; 165/237

(56) References Cited

U.S. PATENT DOCUMENTS

| | | | |
|---|---|---|---|
| 4,382,291 A | 5/1983 | Nakauchi ..................... | 367/93 |
| 4,499,564 A | 2/1985 | Sirai ........................... | 367/93 |
| 4,512,000 A | 4/1985 | Masuko ....................... | 367/93 |
| 4,939,683 A | 7/1990 | van Heerden et al. ...... | 708/212 |
| 5,349,524 A | 9/1994 | Draft et al. .................. | 367/135 |
| 5,415,045 A | 5/1995 | Wadaka et al. .............. | 73/602 |
| 5,576,712 A * | 11/1996 | Bian et al. ................... | 342/160 |
| 5,675,320 A | 10/1997 | Cecic et al. ................. | 340/566 |
| 5,781,460 A | 7/1998 | Nguyen et al. ............. | 367/135 |
| 5,831,528 A | 11/1998 | Cecic et al. ................. | 340/550 |
| 5,914,655 A | 6/1999 | Clifton et al. ............... | 340/506 |
| 5,917,410 A | 6/1999 | Cecic et al. ................. | 340/541 |
| 6,239,736 B1 * | 5/2001 | McDonald et al. .......... | 342/110 |

* cited by examiner

Primary Examiner—Daniel Pihulic
(74) Attorney, Agent, or Firm—Alfred N. Goodman; Stacey J. Longanecker; Peter L. Kendall

(57) ABSTRACT

An apparatus and method is provided for detecting motion or displacement of an object in a monitored zone. The apparatus is disposed between a load and a power source and comprises a transmitter for providing a pulsed signal within a monitored zone. The pulsed signal interacts with objects in the monitored zone and provides a return signal. A receiver receives echoes from a return signal of the pulsed record signal, and a microcontroller circuit processes the echoes. The processing involves retrieving and comparing phase and amplitude information associated with the echoes.

21 Claims, 7 Drawing Sheets

ULTRASONIC DISPLACEMENT SENSOR USING ENVELOPE DETECTION

FIELD OF THE INVENTION

The present invention relates generally to a method and system for controlling lighting fixtures in a room via a motion sensor. More particularly, the invention relates to the detection of displacement in a room using ultrasonic pulses and envelope detection techniques to accurately detect displacement in favorable and unfavorable environments.

BACKGROUND OF THE INVENTION

Many commercial, industrial, and government facilities require a significant number of lighting fixtures for adequate illumination, and therefore use a significant amount of power to operate the fixtures. In an effort to reduce costs in powering the light fixtures, as well as address environmental conservation concerns, a number of lighting control systems are used which employ sensors to automatically and selectively power the light fixtures on and off. Such lighting control systems are especially useful to automatically power down lights used infrequently, and thereby minimize lights remaining on unnecessarily after users have vacated the area. Thus, lighting control systems can provide significant energy and cost savings.

Currently, different types of occupancy sensors such as passive infrared ("PIR") ultrasonic, microwave and acoustic sensors, for example, are used for lighting control systems. The PIR sensor activates lighting fixtures whenever a moving or additional heat source is detected. The ultrasonic sensor emits ultrasonic vibrations at frequencies of 25 kHz or higher and listens to the return of echoes. If a significant Doppler shift is detected, it indicates a high probability that there is movement in the room. The lighting fixtures are then activated in response to the detected movement. Based on a preset time interval, the light fixtures are activated to illuminate the room for a period of time that is typically between three and sixty minutes in duration. The motion sensitivity of the sensors is usually set by users upon the initial installation of the sensors.

PIR sensors, however, are characterized by a number of disadvantages. First, PIR sensors cannot detect motion behind barriers in a room. For instance, if a secretary is standing behind a file cabinet, the PIR sensor cannot detect motion occurring behind the file cabinet. Therefore, it may appear to the sensor that the secretary is no longer in the room, and the lights will be powered off once the preset time period for illumination has expired.

Secondly, PIR sensors are susceptible to "dead spots" which are areas in the room where the PIR sensors are less sensitive to heat sources. The dead spots usually occur in areas that have obstructions or at the fringes of the range of the PIR sensor.

Ultrasonic sensors suffer from the following disadvantages. Firstly, ultrasonic sensors are subject to false tripping where the lights can be powered based on false readings. The cause of false tripping is usually heating and air conditioning units moving air flow. The change in air temperature effects the return echoes by introducing phase and amplitude changes which, in turn, changes the arrival time of the echoes. Since the echoes do not arrive when expected, the ultrasonic sensors assume that movement has been detected in the room.

Secondly, ultrasonic sensors typically use continuous wave ultrasonic signals. Ultrasonic sensors using continuous wave signals respond to any detected motion in a room. There is no discrimination between a small object close to the ultrasonic sensor and a larger object that is further away. In other words, there is no range discrimination using continuous wave ultrasonic signals.

Thirdly, ultrasonic sensors do not perform as well in noisy environments. The noise can give false readings, causing the lights to power off at an inappropriate time.

Fourthly, conventional ultrasonic sensors draw a lot of current. It would be preferable to operate an ultrasonic sensor with as little current as necessary.

Therefore, a need exists for an occupancy sensor that can detect objects behind obstacles in a room. The occupancy sensor should also be able to address dead spots in a room. In addition, the occupancy sensor should also be able to address the problems associated with the effects of heating and air conditioning on air flow. Further, the occupancy sensor should be able to operate in noisy environments, as well as draw minimal current.

SUMMARY OF THE INVENTION

The above and other objectives are substantially achieved by an apparatus and method employing a circuit for detecting motion within a monitored zone.

The apparatus is disposed between a load and a power source and comprises a transmitter for providing a pulsed record signal within a monitored zone. The pulsed signal interacts with objects in the monitored zone and provides a return signal which is a record. A receiver receives echoes from a return signal of the pulsed signal, and a microcontroller circuit processes the echoes. The processing involves retrieving phase and amplitude information associated with the echoes.

In accordance with an embodiment of the present invention, the microcontroller compares amplitude and phase information associated with echoes of a first record to amplitude and phase information associated with echoes of a second record.

In accordance with another embodiment of the present invention, a difference in at least the phase or amplitude indicate that displacement of an object occurred in the monitored zone.

In accordance with another embodiment of the present invention, the load is activated upon detection of displacement by the apparatus. The load can be associated with at least one of a lighting system, heating ventilation and air conditioning system, security system and the like.

BRIEF DESCRIPTION OF THE DRAWINGS

The details of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENTS

Figure 1:
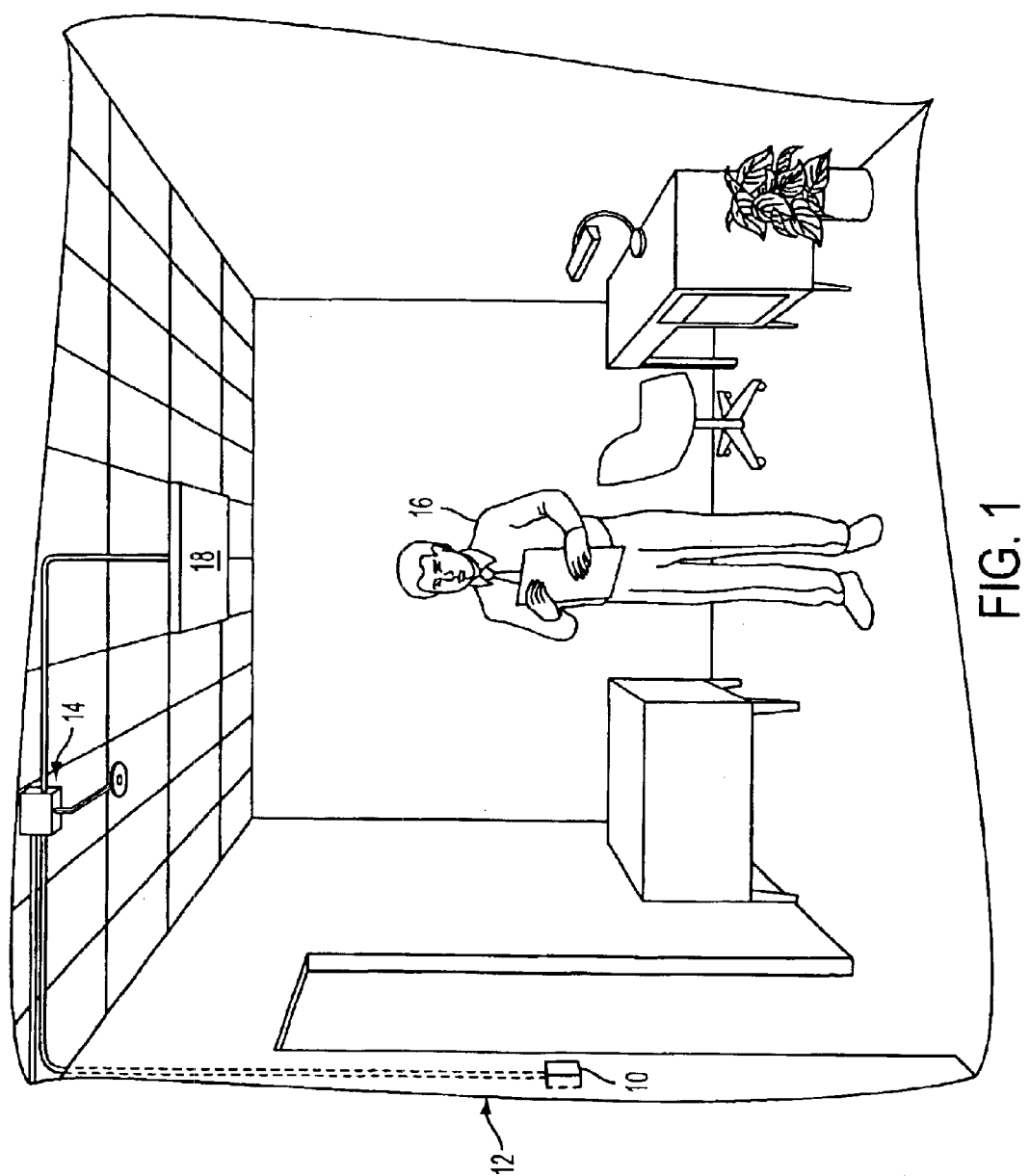
FIG. 1 illustrates a lighting control system mounted on a wall for controlling suspended lighting fixtures, and constructed in accordance with an embodiment of the present invention.

A switching control system 10 constructed in accordance with the present invention is shown in FIG. 1. The switching control system 10 is implemented with lighting fixtures for illustrative purposes and is therefore hereinafter referred to as a lighting control system 10. The control system, however, can be used with a number of different types of loads such as heating ventilation and air conditioning ("HVAC"), security and temperature control systems. The lighting control system 10 is secured to a wall 12 preferably 41 to 53 inches vertically from the floor. The height is selected to enable the motion sensor (not shown) in the lighting control system to detect when an occupant 16 is walking in proximity of the sensor. However, it will be appreciated by those skilled in the art that the lighting control system 10 can be ceiling mounted without departing from the scope of the present invention. As will be described below, the lighting control system 10 controls the powering up and down of lighting fixtures 14 which are typically mounted overhead to a ceiling 18.

While the lighting control system 10 is shown in FIG. 1 secured to a wall in a room with ceiling mounted lighting fixtures, the system 10 can be installed in indoor areas, for use with or without overhead lighting fixtures (e.g., floor lamps can be used). In an embodiment of the invention, lighting control system 10 can be used in outdoor areas. Furthermore, lighting control system 10 can be mounted on various surfaces such as the ceiling or on a vertical support or an angled wedge and at various heights to detect, for example, persons sitting in or walking about the "lighted area". The term "lighted area" defines the area served by the lighting fixtures 14 controlled by a lighting control system 10, and does not necessarily imply that the fixtures 14 are powered up.

Figure 2:
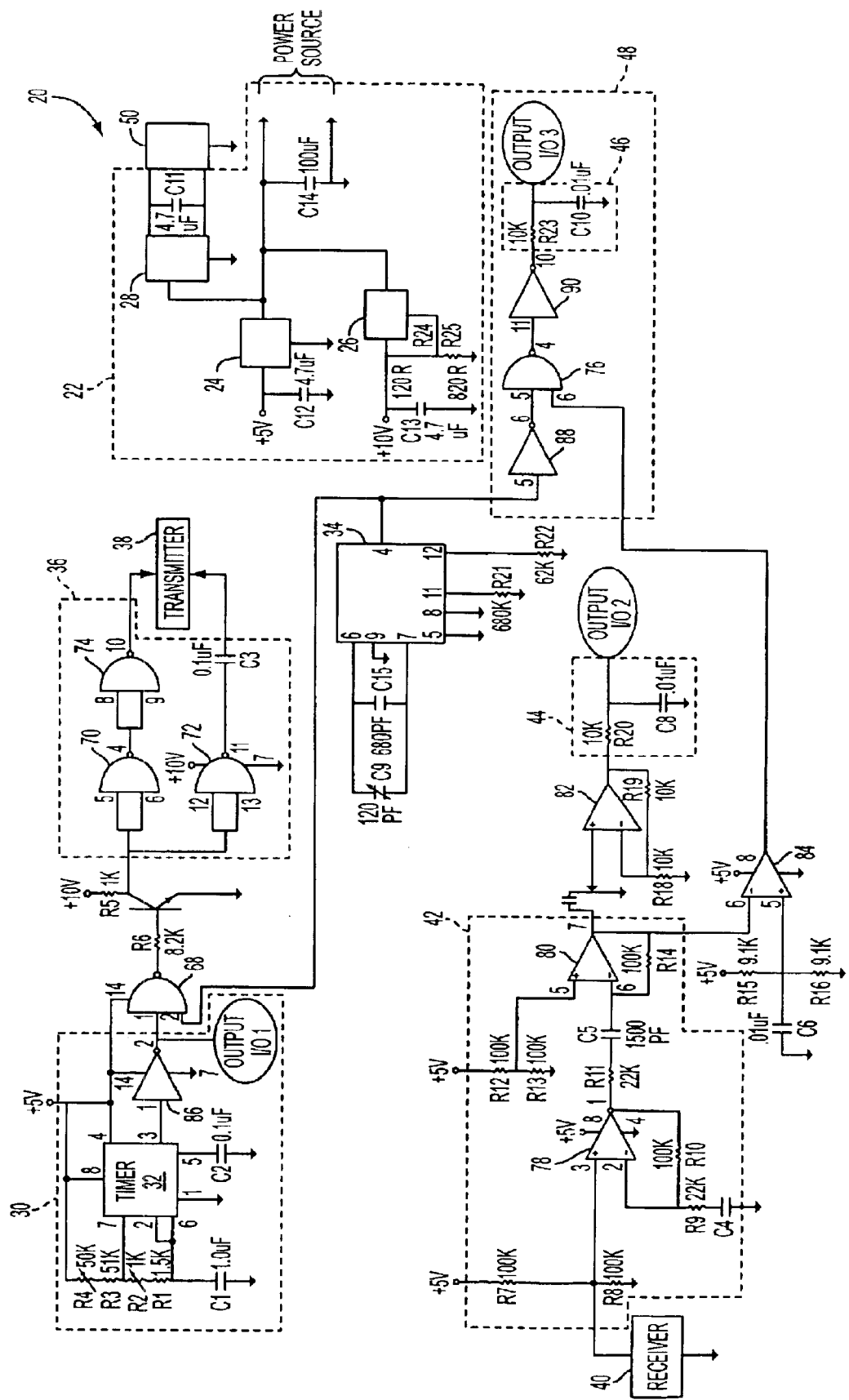
FIG. 2 is a schematic diagram of an envelope detection circuit used to determine the displacement of an object for the lighting control system of FIG. 1 in accordance with an embodiment of the present invention.

The lighting control system 10 will now be discussed with reference to FIG. 2 which is a schematic diagram of an envelope detection circuit 20 used to determine displacement of an object by the lighting control system 10 of FIG. 1 in accordance with an embodiment of the present invention. Specifically, the envelope detection circuit 20 comprises a power supply circuit 22, a timing circuit 30, a transmitter driver circuit 36, a phase lock loop chip 34, an amplifier circuit 42, a carrier half-wave rectification circuit amplifier 82, a hard limited circuit amplifier 84, and a modified exclusive OR circuit 46, and a microcontroller 50.

The power supply circuit 22 comprises a first power regulator 24 connected to a capacitor C12 and an adjustable power regulator 26 connected to capacitor C13 and resistors R24 and R25. The first power regulator 24 and adjustable power regulator 26 are connected to second power regulator 28 and to an external power source (not shown). A filter capacitor C14 is connected across the input power source. A capacitor C11 is connected across the output of the second power regulator 28. The adjustable power regulator 26 is preferably an adjustable power regulator model no. LM317LZ, and first and second power regulators 26 and 28 are preferably a power regulator such as model no. LM78L05ACZ. Both types of regulators are manufactured by National Semiconductor Corporation.

The power supply circuit 22 receives preferably about 12 to 24 volts DC. The first power regulator 24 preferably provides about five volts DC to circuits within the lighting control system requiring a DC input signal, including the microcontroller 50. The adjustable power regulator 26 preferably provides about ten volts to the transmitter drive circuit 36 which drives the transmitter 38.

In an embodiment of the present invention, an alert indication can be provided by the microcontroller 50 to a user which indicates that the lighting control system 10 needs to be serviced. The alert indication can be a visual indication, audible indication or a combination of the two.

Figure 3:
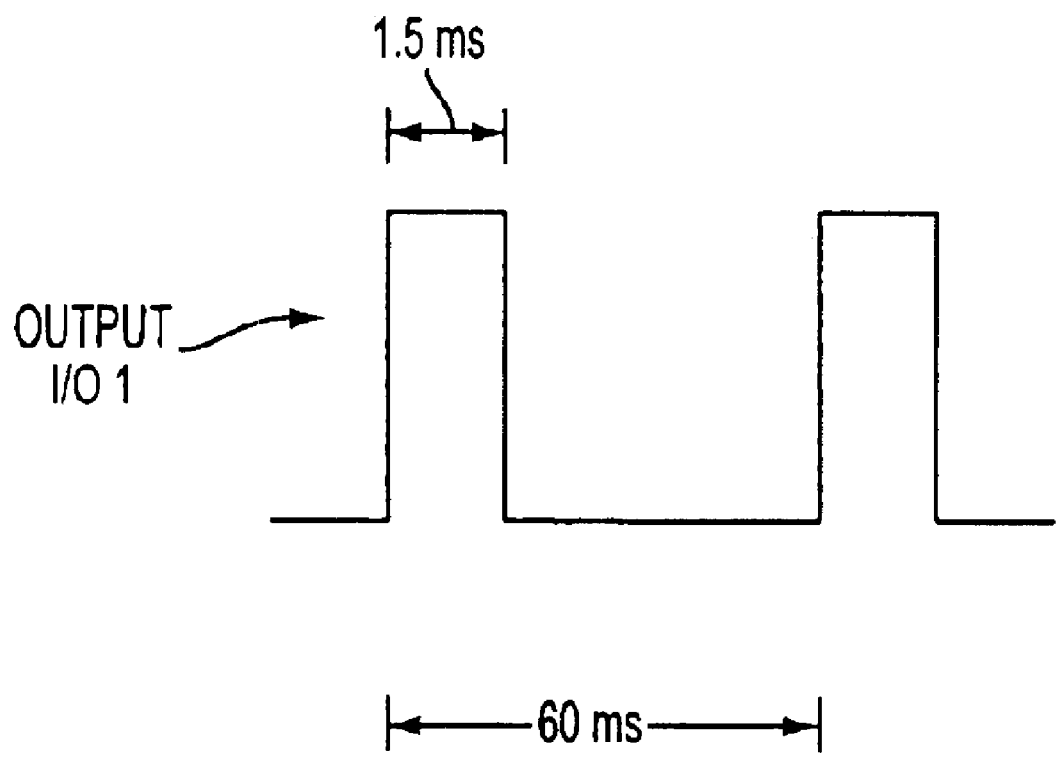
FIG. 3 is an output signal for the envelope detection circuit in accordance with an embodiment of the present invention.

The timing circuit 30 comprises a timing chip 32 which is preferably a timing integrated chip model no. 555 manufactured by Motorola Inc. of Schaumburg, Ill. The timing chip 32 is connected to capacitors C1 and C2, resistor R1, adjustable resistor R2, resistor R3 and adjustable resistor R4. An inverter 86, which inverts an output signal from the timing chip 32, provides an output signal I/O 1. Output signal I/O 1 which is shown in FIG. 3 is preferably about 1.5 ms in duration and occurs in about 60 ms intervals.

In accordance with an embodiment of the present invention, the timing function of timing circuit 30 can be implemented by microcontroller 50. Using micro-controller 50 to perform the timing function provides for having an adjustable I/O 1 signal that can be adjusted to conform with a changing room size. For example, a threshold value is compared to the recovered echo to determine the size of the room based on the return time of the echo. For instance, some conference rooms can be sectioned off based upon the number of users in a room. When a large number of users are expected, the collapsible walls can be folded away to accommodate the large number of users. Thus, the microcontroller 50 can adapt to a changing environment based on a changing room size.

The phase lock loop chip 34 operates in a conventional manner and is preferably a phase lock loop chip model no. MC14046B manufactured by National Semiconductor. The phase lock loop chip 34 is connected to resistors R21 and R22, capacitor C15 and adjustable capacitor C9. The adjustable capacitor C9 is capable of adjusting the frequency of the signal provided by the phase lock loop chip 34. The frequency provided by the phase lock loop chip 34 is preferably about 32.8 kHz. This frequency can be higher or lower than 32.8 kHz. However, using a lower frequency can affect users with hearing aids.

The output signal from the phase lock loop chip 34 and the output signal from inverter 86 is provided to NAND gate 68. NAND gate 68 is a conventional NAND gate and gates the 32.8 kHz signal from oscillator chip 34 to the transmitter drive circuit 36. In accordance with an embodiment of the present invention, the signal outputted from NAND gate 68 is a gated 1.5 ms burst every 60 ms. Specifically, inverter 86 disables NAND gate 68 except for when inverter 86 outputs signal I/O 1 and allows the 32.8 kHz signal from the phase lock loop chip 34 to pass through NAND gate 68. It will be appreciated by those skilled in the art that, although the transmit signal is described as a burst, it can also be a chirp that changes in frequency over time.

A resistor R6 connects NAND gate 68 with a transistor Q1. NAND gate 68 provides the 32.8 kHz burst signal to transistor Q1. It is the 32.8 kHz burst signal which drives transistor Q1. Transistor Q1 is connected to NAND gate 70, which is also connected to NAND gate 74. Transistor Q1 is also connected to NAND gate 72 and capacitor C3. Capacitor C3 is connected to the transmitter 38 on one side, and NAND gate 74 is connected to the transmitter 38 on a second side.

NAND gate 70, NAND gate 72, NAND gate 74 and capacitor C3 comprise driver circuit 36. NAND gates are used in driver circuit 36 to drive one side of the transmitter 38 high when the other side of transmitter 38 is low and vice versa. Transmitter 38 can be driven from either direction so that when pin 10 of NAND gate 74 is high and pin 11 of NAND gate 72 is low, there is preferably about 10 volts from pin 10 of NAND gate 74 to pin 11 of NAND gate 72. Similarly, when pin 11 of NAND gate 72 is high and pin 10 of NAND gate 74 is low, there is preferably about 10 volts from pin 11 of NAND gate 72 to pin 10 of NAND gate 74. Specifically, transmitter driver circuit 36 provides 20 volts peak to peak using a 10 volt power supply.

Figure 5:
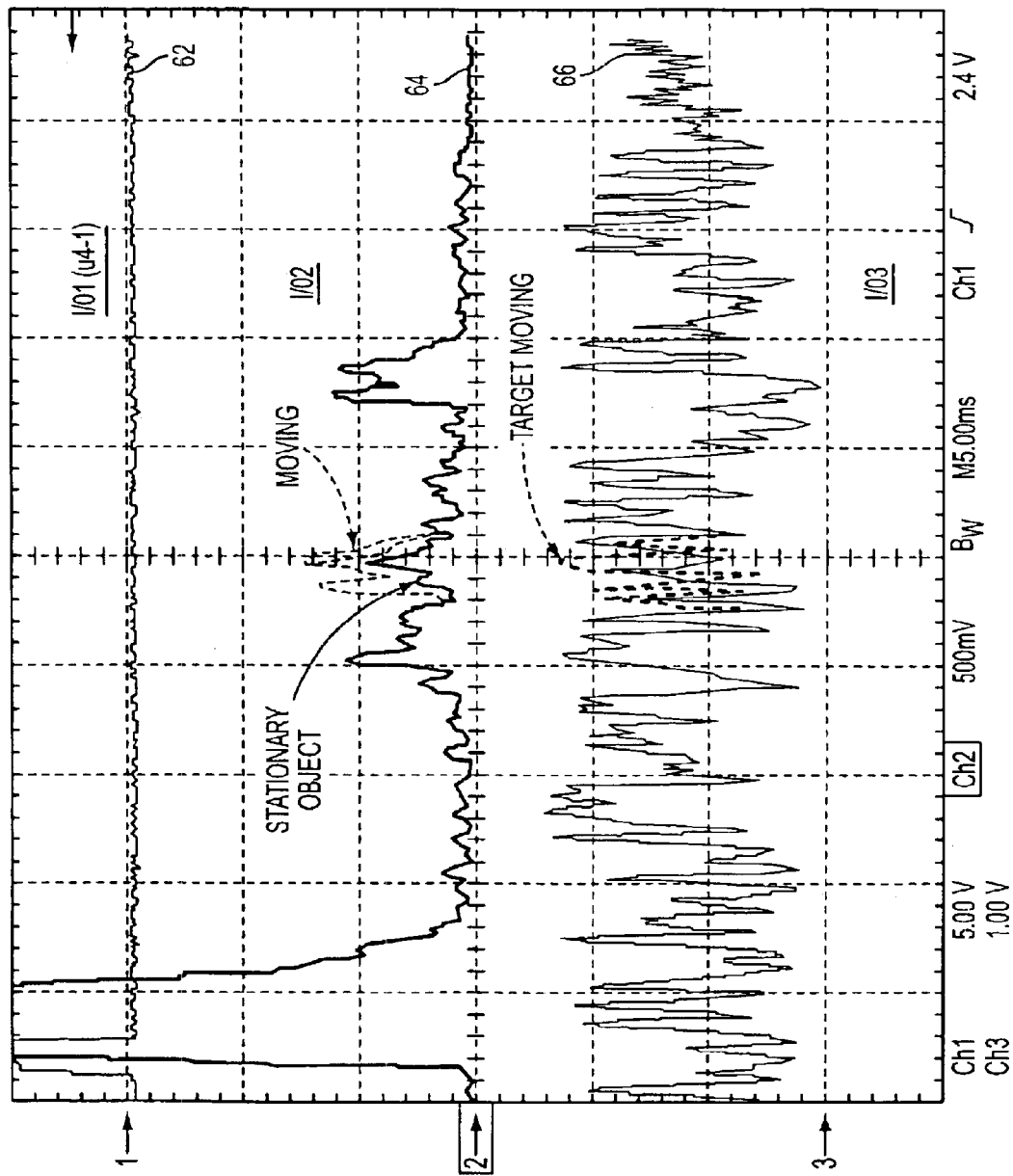
FIG. 5 is graph from an oscilloscope showing various output signals for the envelope detection circuit in accordance with an embodiment of the present invention.

Transmitter 38 is a conventional ultrasonic transducer that outputs preferably a 32.8 kHz, 1.5 ms burst that occurs preferably about every 60 ms as shown in FIG. 5 waveform 62. Transmitting a signal burst requires less current than providing a continuous signal. The prior art uses a continuous signal, and, thus, requires more current.

Initially, the first few transmit records can be used to estimate the room size and determine the position of objects that are presently in the room.

The room echo is received at receiver 40. Receiver 40 is a conventional receiver and provides the echo to amplification circuit 42. Amplification circuit 42 comprises amplifier 78 and amplifier 80. amplifier 78 is a first stage amplifier connected to resistors R7, R8, R9, R10, and capacitor C4. Specifically, amplifier 78 is preferably a 32.8 kHz carrier amplifier.

In accordance with an embodiment of the present invention, the received echo can be amplified using amplifier 78 and a band pass filter. For example, a feedback capacitor can be connected across resistor R10 to provide a band pass filter.

The amplified output of amplifier 78 is preferably provided to a second stage amplifier. The second stage amplifier, which is amplifier 80, further amplifies the output from amplifier 78. Amplifier 80 is connected to resistors R11, R12, R13, R14 and C5. In accordance with an embodiment of the present invention, a band pass filter can also be used with amplifier 80 via a capacitor across R14. It will be appreciated by those skilled in the art that amplification of the received echo can be performed using a single amplifier without departing from the scope of the present invention.

The amplified signal from amplifier 80 is provided to amplifier 82 and to amplifier 84. Amplifier 84 is connected to resistors R15, R16 and C6 and is a hard limited amplifier. The gain is high which is an open loop. Information from amplifier 84 is contained in the zero crossings from the output signal.

Amplifier 82 is connected to variable resistor R17, resistors R18, R19 and capacitor C7 and performs half-wave carrier rectification on the amplified signal from amplifier 80 and also removes the DC offset voltage from the signal.

The rectified signal from amplifier 82 is provided to low pass filter circuit 44 comprising resistor R20 and capacitor C8. Low pass filtering the rectified signal removes the high frequencies from the signal producing output I/O 2 which is the amplitude envelope of the rectified signal. The current envelope from the current echo is compared to the previous echo from the previous record by the microcontroller 50. Specifically, the micro-controller 50 looks for changes in amplitude between the current and previous amplitude envelopes. For example, in FIG. 5, waveform 64 shows an increase in amplitude about 20 ms after the effects of the transmitted signal dissipates for the current amplitude envelope. Microcontroller 50 then determines, based on a threshold value for changes in amplitude, whether motion has occurred in the room.

Figure 4A:
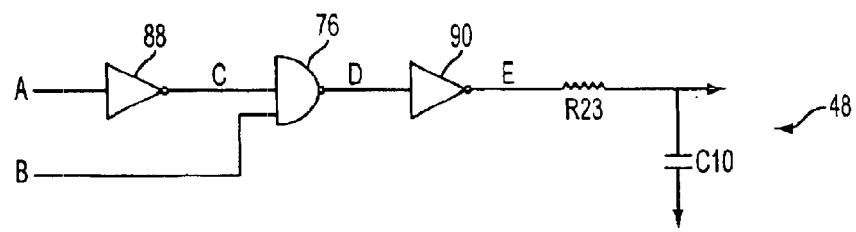
FIGS. 4A and 4B depict, respectively, a modified exclusive OR circuit for the envelope detection circuit and associated signals in accordance with an embodiment of the present invention.

The phase lock loop chip 34 also provides a 32.8 kHz output signal to inverter 88. Inverter 88 provides an inverted 32.8 kHz signal to NAND gate 76 which is combined with an output signal from amplifier 84. The output from NAND gate 76 is provided to inverter 90 which inverts the signal. The inverted signal from inverter 90 is provided to low pass filter circuit 46 which comprises resistor R20 and capacitor C10. The modified exclusive OR circuit is shown in FIG. 2 and in greater detail in FIG. 4A where the low pass filtered signal is represented as output I/O 3 which is the phase envelope of the hard limited signal from amplifier 84.

In an embodiment of the present invention, the function of the modified exclusive OR circuit 48 can be performed using a quad exclusive OR integrated circuit, for example chip model no. MC14070B manufactured by National Semiconductor. The quad exclusive OR integrated circuit can be used to replace inverters 88 and 90 and NAND 76. In addition, the quad exclusive OR integrated circuit can be used to replace NAND 68 and inverter 86.

Figure 4B:
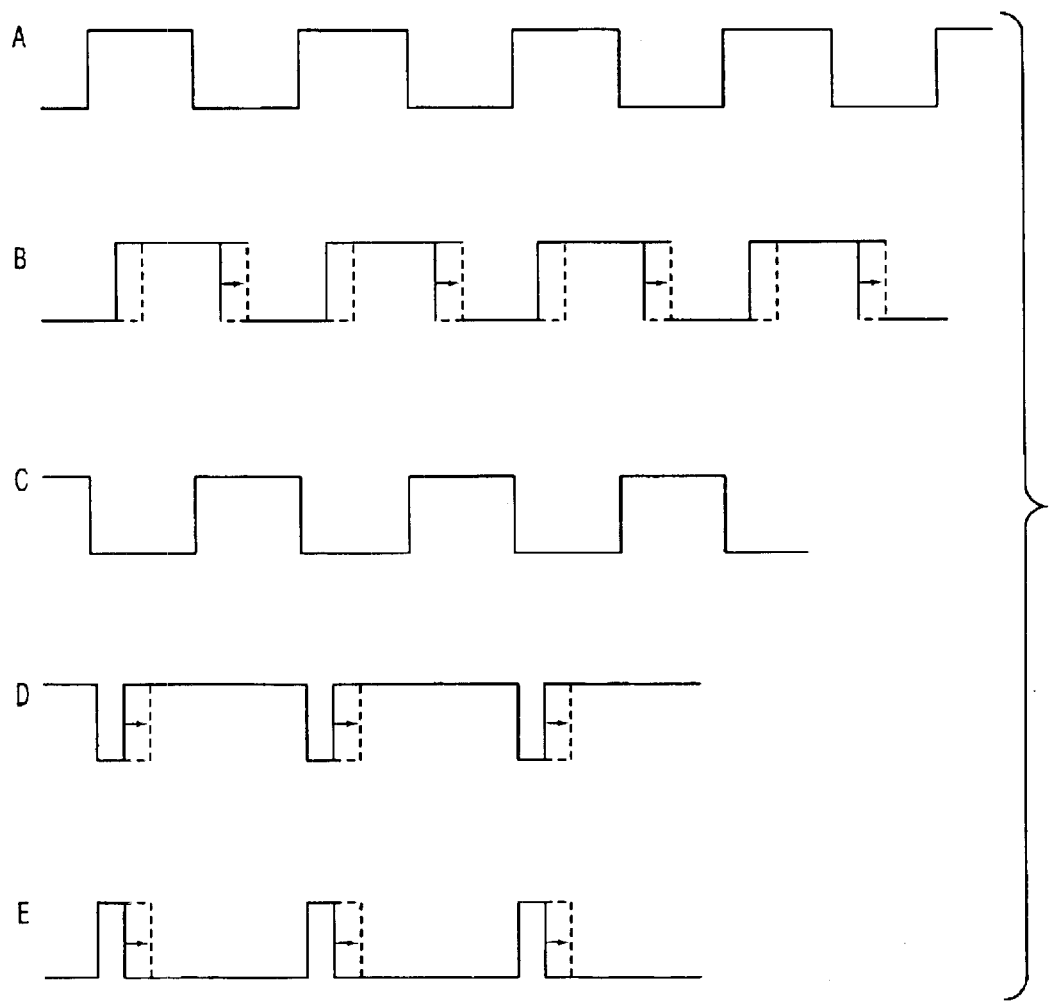

FIG. 4B is an output signal for the modified exclusive OR circuit 48 for the envelope detection circuit 20 in accordance with an embodiment of the present invention. Input signal A is the output of the phase lock loop chip 34 which is preferably a 32.8 kHz signal, and input signal B is the output from the hard limited circuit amplifier 84, inverter 88 inverts the input signal A and provides output signal C, which is an inverted input A signal.

As the phase difference between inputs A and B increases, the output signal E becomes larger. That is, as input signal B shifts to the right in the direction of the arrows relative to signal A, the output signal E becomes wider. Therefore, the wider the output signal E, the larger the phase difference between input signals A and B.

Table 1 is a truth table showing the relationship between input signals A, B, and output signals D and E and a conventional exclusive OR circuit.

TABLE 1

| IN A | OUT C | IN B | OUT D | OUT E | XOR Exc OR |
|---|---|---|---|---|---|
| 0 | 1 | 0 | 1 | 0 | 1 |
| 0 | 1 | 1 | 0 | 1 | 0 |
| 1 | 0 | 0 | 1 | 0 | 0 |
| 1 | 0 | 1 | 1 | 0 | 1 |

Since NAND gate 76 is a NAND gate, the output will always be high except when both inputs are high. When both inputs are high, the output of NAND gate 76 will go low, as reflected in Table 1, where input signals C and B are high and the output signal D is low. Inverter 90 is an inverter and inverts the output values for D and provides output signal E. Output signal E is only high when both input signals are high. The output of inverter 90 is different from a traditional exclusive OR gate, the output of which is only high when one of the input signals are high. If both input signals have the same value, then the exclusive OR output is low.

Referring now to FIG. 5 which shows a graph from an oscilloscope showing various output signals for the envelope detection circuit 20, waveform 62 is the output I/O 1, waveform 64 is output I/O 2 and waveform 66 is output I/O 3. Waveform 62 is the 1.5 ms enabling gate signal for the 32.8 kHz burst signal sent from transmitter 38. Waveform 64 is the amplitude envelope of the return echo for the 1.5 ms burst signal. The dotted lines show the amplitude envelope for a subsequent return echo. As can be seen, the amplitude for the subsequent return echo is much larger than the amplitude of the previous return echo, in the area of the echo record corresponding to the distance from the sensor to where the motion occurred. This implies that there is movement in the room. However, a change of amplitude for the return echo envelope can result from moving air or turbulence and homogeneities in temperature and relative humidity of the air, which results in interference, scattering and refraction of the transmitted signal in the room. For example, the air conditioning system could have been turned on. The changes affect the echoes returning to the receiver 40.

Output I/O 3 can be used by the microcontroller 50 to detect motion in a room also. The phase envelope of the previous record is compared to the phase envelope of the present record. The solid line for waveform 66 is the previous phase envelope for the previous record, and the dotted line is the phase envelope for the current record. If there was no change in phase, the dotted line and solid line should be superimposed on each other. Since there is a noticeable shift, it indicates that there is motion in the room.

The microcontroller 50 can compare the results from I/O 2 and I/O 3 to determine whether there was any displacement in the room. For example, in accordance with an embodiment of the invention, at a specific location in the echo record, a significant difference in phase, but no significant difference in amplitude, can be an indication of a false reading. In accordance with another embodiment of the invention, a significant difference in amplitude, but no significant difference in phase, can be an indication that there is a probability of displacement. In accordance with still another embodiment of the invention, no significant difference in amplitude or phase indicates a high probability that no displacement occurred. In accordance with another embodiment of the invention, a significant difference in amplitude and phase, can be an indication that there is a high probability that displacement occurred.

Figure 6:
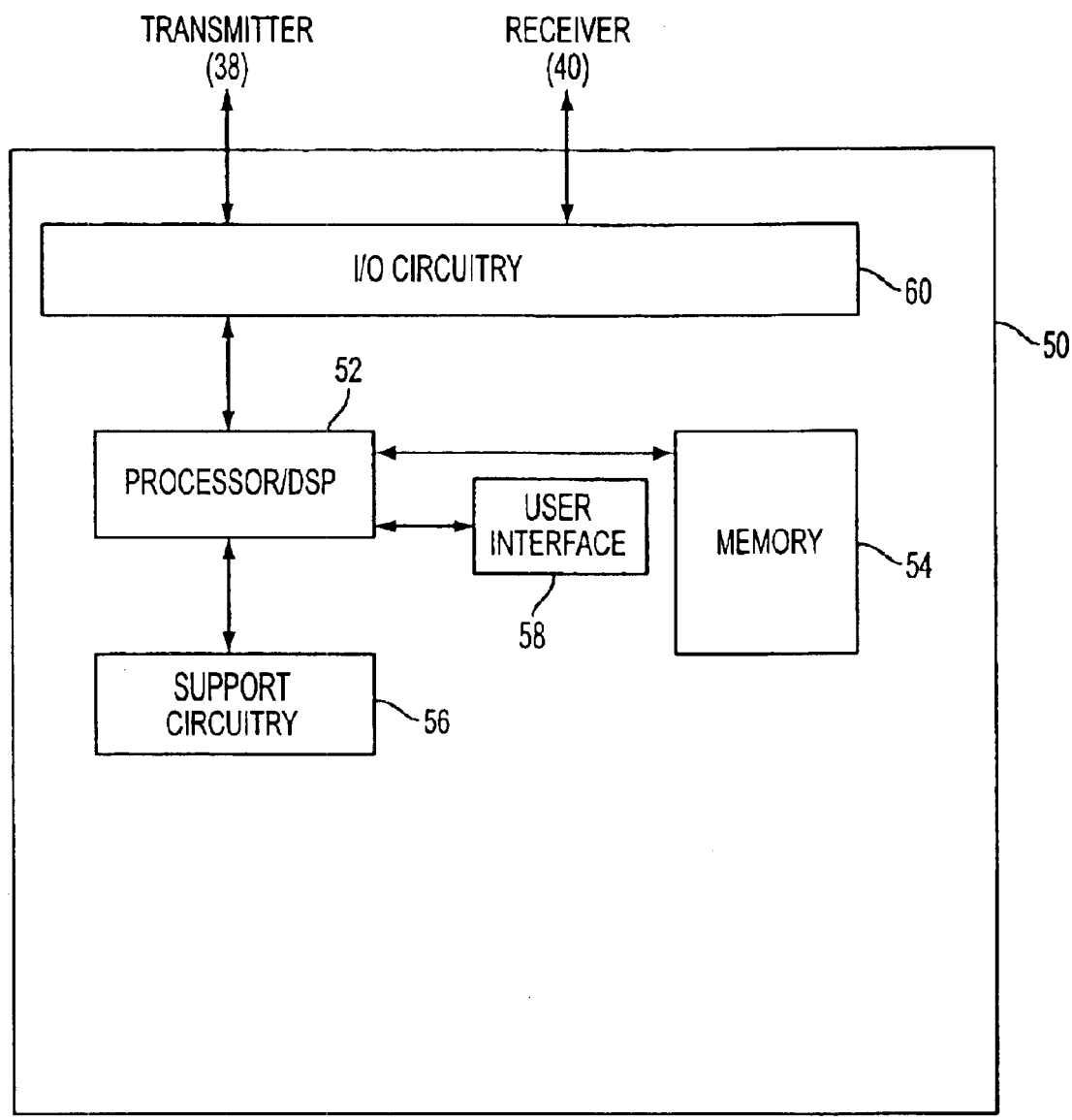
FIG. 6 is a microcontroller for using envelope detection to determine displacement of an object in accordance with an embodiment of the present invention.

Turning to FIG. 6, an alternative embodiment for performing the amplitude and phase envelope detection functions of the envelope detection circuit 20 is depicted. Specifically, FIG. 6 depicts the microcontroller 50 suitable for use in the lighting control system 10. The microcontroller 50 comprises a microprocessor/Digital Signal Processor (DSP) 52, as well as memory 54 for storing programs for performing various envelope detection functions. The microprocessor/DSP 52 cooperates with conventional support circuitry 56 such as power supplies, clock circuits, analog to digital (A/D) and digital to analog (D/A) conversion circuitry, filtering circuits such as high pass, low pass and the like, as well as circuits that assist in executing the envelope detection functions of the present invention. A user interface device 58 such as a sensitivity adjuster is provided to adjust the sensitivity of the lighting control system 10. In accordance with an embodiment of the invention, the sensitivity adjuster can comprise, but is not limited to, a potentiometer, a dip switch and a key pad.

The microcontroller 50 also comprises input/output circuitry 60 that forms an interface between the microprocessor 52, transmitter driver circuit 36, transmitter 38 and receiver 40. The input/output circuitry 60 can interface with the lighting fixtures 14 such that the lighting fixtures can be powered on when displacement is detected. The lights will remain on as long as the displaced object or person remains in the room or movement of the displaced object or person is detected within a predetermined time interval.

The microcontroller 50 is depicted as a general purpose computer that is programmed to perform, in general, the envelope detection functions of the envelope detection circuit 20. Specifically, the microcontroller 50 performs the timing functions of timing circuit 30 and NAND gate 68, the oscillator function of the phase lock loop chip 34, the carrier rectification functions of amplifier 82, the hard limiter functions of amplifier 84, the low pass filtering of low pass filter 44,s filter 44, and the modified exclusive OR functions of modified exclusive OR circuit 48, in accordance with the present invention. The invention, however, can be implemented in hardware, in software, or a combination of hardware and software. As such, the envelope detection functions described above with respect to the various figures are intended to be broadly interpreted as being equivalently performed by software, hardware, or a combination thereof.

Figure 7:
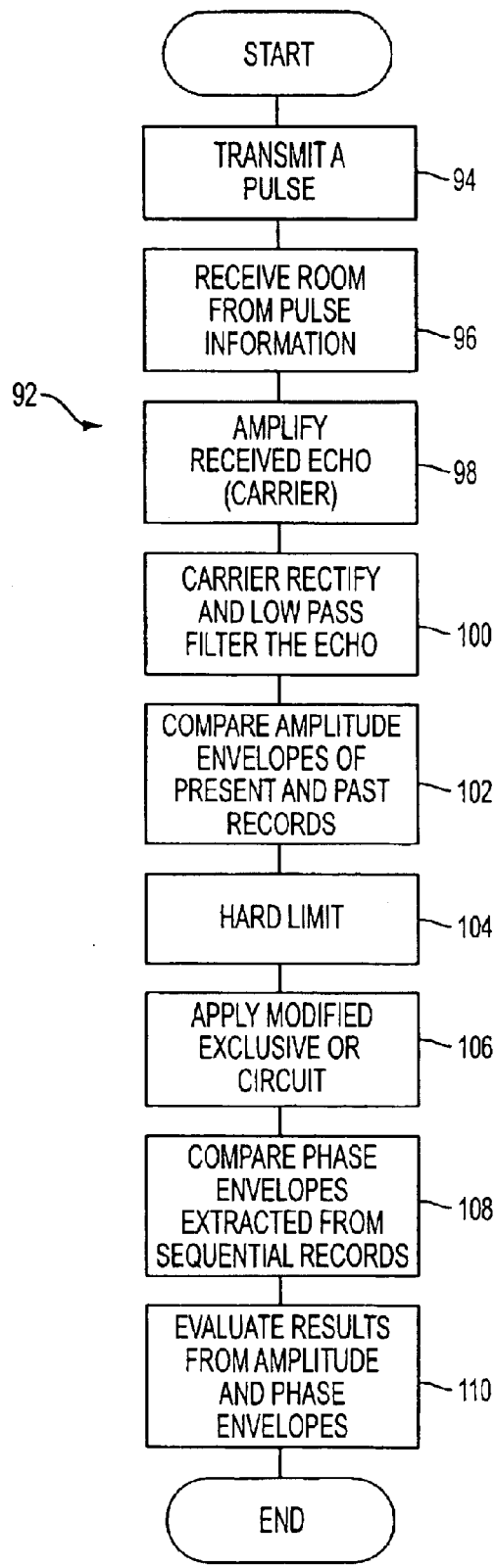
FIG. 7 is a flow chart of a method for using envelope detection to determine displacement of an object in accordance with an embodiment of the present invention.

The present invention will now be discussed with reference to FIG. 7. FIG. 7 is a flow chart of a method 92 for using envelope detection to determine displacement of an object in accordance with an embodiment of the present invention. The method 92 is initiated with a burst being transmitted by the transmitter 38 at step 94. If this is the first time the lighting control system is being used in the room, a series of burst signals will be sent to form an image of objects presently in the room. It should be appreciated that bursts are being transmitted and not a continuous 32.8 kHz signal as in the prior art.

At step 96, the echo of the burst is received by the receiver 40. Depending on how the envelope detection circuit 20 is designed and optioned, a portion of the return echo can be discarded. Although a single pulse is transmitted, the echo continues to return over a 60 second record from various parts of the room. For example, the transmit pulse can encounter a chair in the front of the room and later encounter the back wall. The echo from the chair will return first and the echo from the back of the wall will return later in time.

If transmit pulses occur too frequently, it is possible that the next transmit pulse can encounter the echo from the chair. If this occurs, there can be interference. Thus, the echo return record length must be long enough for room echoes to dissipate. Dissipation of the room echoes takes about 60 ms for most rooms. During the first 10 ms of the record, the transmitted signal overloads the receiver front end. Hence part of the record is ignored.

At step 98, the received echo is amplified. The amplification can be performed in two stages or in a single stage. In accordance with an embodiment of the present invention, a band pass filter is used to reduce noise and impairments in the return echo.

At step 100 the amplified echo is carrier rectified and low pass filtered in order to remove the carrier and look at the amplitude envelope.

At step 102, the amplitude of the current envelope for the current record is compared to the amplitude of an echo for the previous record. Changes in amplitude between the two envelopes can indicate that a displacement occurred in the room.

At step 104, the amplified echo from step 102 is hard limited to examine the zero-crossings of the amplified signal. The hard limited signal is provided to the modified exclusive OR circuit at step 106 where the phase envelope for the return echo is retrieved.

At step 108, the phase of the echo for the current record is compared to the phase of the echo for the previous record. If there is a difference in phase between the two envelopes it indicates that displacement occurred in the room.

It should be appreciated by those skilled in the art that steps 100 and 102 can be done in parallel in real time with steps 104, 106 and 108 without departing from the scope of the present invention.

At step 110, the microcontroller 50 compares the results from the amplitude envelope and the phase envelope to determine whether a displacement actually occurred. Having two means of determining whether displacement occurred eliminates many of the problems that occur when a lighting control system is used in a noisy or changing environment. As each pulse is transmitted, the returning echo is compared to the echo of a previous record.

In accordance with an embodiment of the present invention, the envelope detection circuit 20 can store the results of a number of comparisons to get an improved estimate of whether displacement occurred.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and the following claims.

What is claimed is:

1. A load controller disposed between a load and a power source, comprising:

a transmitter adapted to provide a pulsed signal within a monitored zone, said pulsed signal interacting with objects in said monitored zone and providing a return signal;

a receiver adapted to receive and store echoes from said return signal of said pulsed signal;

a microcontroller circuit adapted to process said echoes, said process comprising retrieving phase and amplitude information associated with said echoes; and a modified exclusive OR circuit for retrieving said chase information from said received echoes.

2. The load controller of claim 1, wherein said processing performed by said microcontroller compares at least one of said implitude and phase information associated with echoes associated with a first echo record to echoes associated with a second echo record.

3. The load controller of claim 2, wherein a difference in at least one of said amplitude and phase information indicates a lisplacernent in said monitored zone.

4. The load controller of claim 1, wherein said load is activated upon detection of displacement by said load controller.

5. The load controller of claim 1, wherein said received echoes comprise Doppler-shifted signals.

6. The load controller of claim 1, wherein said pulsed signal comprises a 32.8 kHz pulsed signal.

7. The load controller of claim 1, wherein said load comprises at least one of a lighting system, an alarm system, and a heating and air conditioning (HVAC) system.

8. The load controller of claim 1, wherein said load is activated when phase and amplitude information from said received echoes is indicative of displacement in said monitored zone.

9. The load controller of claim 1, wherein said load is deactivated when displacement is not determined within a predetermined threshold period.

10. The load controller of claim 1, wherein said pulsed signal is about 1.5 ins in duration.

11. The load controller of claim 1, wherein said pulsed signal is transmitted in about 60 ms intervals.

12. The load controller of claim 1, wherein said transmitter comprises an ultrasonic transmitter.

13. The load controller of claim 1, wherein said monitored zone comprises a bounded area.

14. A method of detecting displacement for a monitored zone, comprising:

transmitting a pulsed signal within said monitored zone using a transmitter;

receiving echoes associated with said transmitted pulsed signal, said received echoes indicative of objects and displacement thereof within said monitored area;

storing said received echoes associated with said transmitted pulsed signal;

processing said received echoes to retrieve and compare phase and amplitude information, said phase and amplitude information indicative of displacement within said monitored area;

amplifying said received echoes to amplify said echoes over noise; and hard limiting said amplified received echoes to retrieve zero-crossing information from said amplified received echoes.

15. The method of claim 14, further comprising:
filtering said amplified received echoes to remove noise from said received echoes.

16. The method of claim 14, further comprising:

providing said hard limited received echoes to a modified exclusive OR circuit to retrieve phase information from said hard limited received echoes.

17. The method of claim 14, further comprising:

carrier-rectifying said amplified received echoes with a carrier rectifier amplifier so that said amplified received echoes signal comprise a positive valued signal; and filtering said carrier rectified received echoes signal with a low pass filter to retrieve amplitude information.

18. A circuit for detecting displacement in a zone, said circuit comprising:

a transmitter for transmitting pulsed signals within said zone;

a receiver for receiving and storing Doppler shifted echoes from said transmitted pulsed signals;

a microcontroller for processing said echoes to determine whether there is a change in amplitude between an echo associated with a current transmitted pulsed signal and an echo associated with a previously transmitted pulsed signal; and a modified exclusive OR circuit for retrieving said phase information from said received echoes.

19. The circuit of claim 18, wherein said microcontroller processes said echoes to determine whether there is a change in phase between said echo associated with said current transmitted pulsed signal and said echo associated with said previously transmitted signal.

20. The circuit of claim 18, wherein a difference in amplitude between said echo associated with said current transmitted pulsed signal and said echo associated with said previously transmitted signal indicates displacement has occurred in said zone.

21. A method of detecting displacement for a monitored zone, comprising:

transmitting a pulsed signal within said monitored zone using a transmitter;

receiving echoes associated with said transmitted pulsed signal, said received echoes indicative of objects and displacement thereof within said monitored area;

storing said received echoes associated with said transmitted pulsed signal;

processing said received echoes to retrieve and compare phase and amplitude information, said phase and amplitude information indicative of displacement within said monitored area;

amplifying said received echoes to amplify said echoes over noise;

carrier-rectifying said amplified received echoes with a carrier rectifier amplifier so that said amplified received echoes signal comprise a positive valued signal; and filtering said carrier rectified received echoes signal with a low pass filter to retrieve amplitude information.

* * * * *